| United States Patent Office | 3,619,950 |
|---|---|
| | Patented Nov. 16, 1971 |

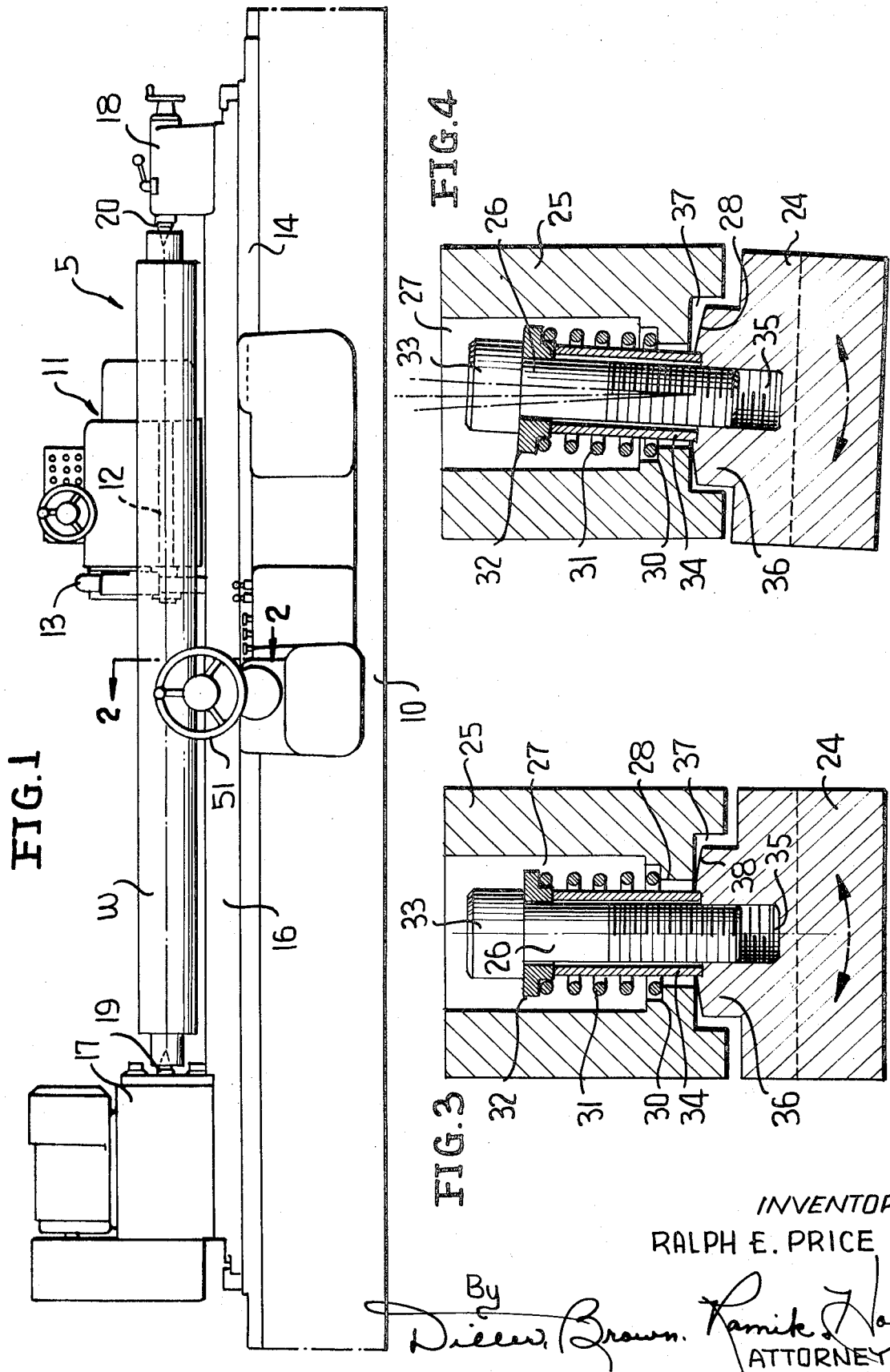

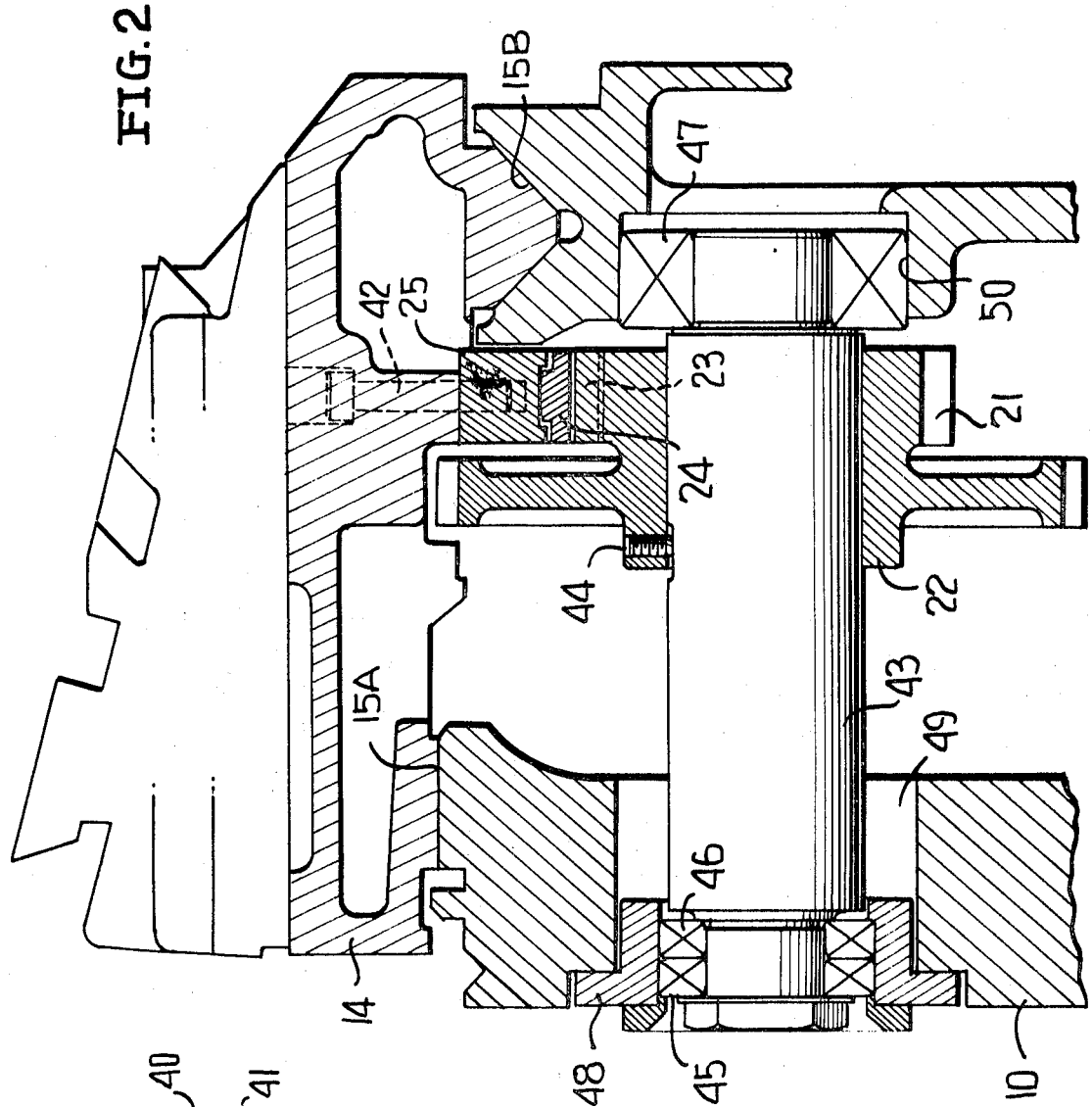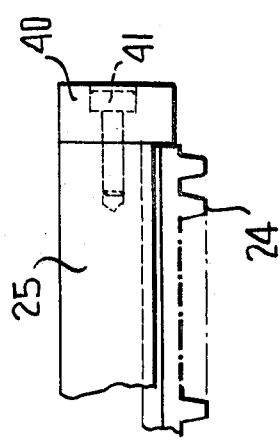

3,619,950
SELF-ALIGNING RACK FOR TRAVERSING MEMBER
Ralph E. Price, Waynesboro, Pa., assignor to Litton Industries, Inc., Beverly Hills, Calif.
Filed Feb. 9, 1970, Ser. No. 9,742
Int. Cl. B24b 3/00, 5/00
U.S. Cl. 51—95                                           9 Claims

ABSTRACT OF THE DISCLOSURE

This disclosure relates to a self-aligning rack. In the customary traverse mechanism comprised of a traversing member or a rack and gear, it is impossible to obtain and maintain perfect alignment between engaging teeth. It is proposed to provide a rack which is self-aligning to absorb the strain of the driving forces without interfering with the desired true tracking of a slidable member or carriage of a machine tool. A crowned surface of the rack is secured against an adapter by a plurality of screws compressing a like number of coil springs to provide a resilient mounting for the rack and thus allowing the rack to tilt on the crowned surface in response to any deviation from the full face tooth contact from the teeth of the driving gear to provide repetitive parallel movement of a carriage in machined ways.

---

This invention relates to new and useful improvements in traverse mechanisms for machine tools, and more particularly to the mounting of a rack on a slidable member or carriage of a machine tool to obtain self-alignment between the teeth of the rack and the driving gear associated therewith to provide for repetitive true tracking of a carriage during longitudinal movement thereof.

Prior to this invention, a traversing member or carriage was moved reciprocally by means of a gear in mesh with the teeth of a rack rigidly secured to the carriage. This is a conventional arrangement. However, it is impossible to align the mating surfaces of the rack teeth with the pinion teeth in both directions of traverse, due to the reversal of forces and the attendant displacement of alignments. This results in slight longitudinal displacement when the carriage is traversed alternately in one direction and then the other.

In accordance with this invention, there is provided a self-aligning rack which is secured to an adapter and carried by a traversing member or carriage which is longitudinally positioned along machined ways of a bed or base. The rack is secured to the adapter by a plurality of screws, retainers and coil springs under strain, to provide flexible movement to permit the rack to absorb minor transverse or angular strain caused by misalignment of the meshing teeth of the rack and gear. The flexible rack will enable full face contact between the gear and rack teeth to provide a constant parallel reciprocating movement between the gear and the carriage.

In accordance with the foregoing, the primary object of this invention is to provide means to insure true tracking of a traversing carriage in machined ways by maintaining a force which is constantly parallel to the ways during the traversing of the carriage.

Another object of this invention is to compensate for minor misalignment between the gear and rack teeth of a traversing mechanism by mounting the rack through an adapter in a manner to yield from the forces and to absorb the strain resulting from the misalignment.

With the above and other objects in view that will hereinafter appear, the nature of the invention will be more clearly understood by reference to the following detailed description, the appended claims and the several views illustrated in the accompanying drawings.

In the drawings:

FIG. 1 is a front view of a conventional grinding machine which uses the principal of the present invention to insure true tracking of the traversing carriage thereof.

FIG. 2 is a fragmentary transverse sectional view taken along the line 2—2 of FIG. 1 and shows on a larger scale the portion of the gear train which rotates to effect longitudinal movement of the carriage through the self-aligning rack.

FIG. 3 is an enlarged transverse sectional view taken through the adapter and self-aligning rack and shows the specific details of the connection therebetween.

FIG. 4 is an enlarged fragmentary transverse sectional view similar to FIG. 3 and shows the self-aligning rack pivoted to a possible aligned position with respect to a gear.

FIG. 5 is a fragmentary elevational view showing one end of the adapter and self-aligning rack and shows the manner in which the longitudinal forces on the rack are transferred to the adapter.

Referring now to the drawings in detail, it will be seen that there is illustrated in FIG. 1 a grinding machine which is generally identified by the numeral 5. The grinding machine 5 includes a base 10 on which a conventional wheel head, generally identified by the numeral 11, is mounted. The wheel head 11 includes a horizontal spindle 12 which carries a rotatably mounted grinding wheel 13. The grinding wheel 13 is driven in the conventional manner by means of a motor and belt drive (not shown).

A carriage 14 is mounted on machined ways 15A and 15B (FIG. 2) of the base 10. A swivel table 16 is secured to the carriage 14 in the customary manner and supports a headstock 17 and a tailstock 18 which have work centers 19 and 20, respectively, between which a workpiece W is mounted for rotation. The headstock 17 provides customary means to rotate the workpiece W for a grinding operation. The carriage 14 is traversed longitudinally of the base 10 during the grinding operation to remove a predetermined amount of stock from the workpiece W in a conventional manner.

Movement of the carriage 14 is effected through a conventional traversing mechanism of which a portion is shown in FIG. 2. Teeth 21 of a gear 22 are in mesh with teeth 23 of a rack 24. The rack 24, in accordance with this invention, is mounted to an adapter 25 in the manner best shown in FIGS. 3 and 4.

Referring now to FIG. 3 in particular, it is to be noted that the rack 24 is mounted to the adapter 25 by means of a plurality of screws 26. In order to facilitate the position of a screw 26 within the adapter 25, the adapter 25 is provided with an enlarged opening 27 which opens to the upper surface thereof. Associated with each opening 27 is a lower and smaller opening 28 which opens through the lower surface of the adapter 25. At this time it is pointed out that each of the openings 27 and 28 may be in the form of a separate bore for each screw 26 or any elongated slot for the reception of a plurality of screws 26.

Between each opening 27 and its associated opening 28 there is formed a shoulder 30. Each shoulder 30 has engaged therewith the lower end of a compression spring 31 with the upper end of the compression spring 31 being engaged with a retainer 32 carried by the upper portion of the screw 26 and normally abutting against the underside of the head 33 thereof.

Each screw 26 in addition to carrying a retainer 32, is provided with a spacer or sleeve 34 which telescopes thereover. It is to be noted that the lower end of each screw 26 is threaded into an internal threaded bore 35 in the upper surface of the rack 24 and serves to clamp the sleeve 34 between the rack 24 and the retainer 32. In this manner, the retainer 32 is disposed at a predetermined distance above the rack 24 and provides for the compressing of the spring 31 a predetermined amount without the necessity of adjusting the screws 26.

It will be readily apparent that the rack 24 is compressibly clamped against the underside of the adapter 25. Preferably, but not necessarily, the rack 24 is provided with a centrally located upstanding rib 36 which is received in a slightly wider recess 37 formed in the underside of the adapted 25. The upper surface of the rib 36 is preferably transversely crowned or rounded as at 38.

It will be readily apparent from FIG. 3 that although the rack 24 is firmly secured to the adapter 25, the rack 24 will yield in response to any strain caused by any misalignment between the meshing teeth of the rack 24 and the gear teeth 21.

Referring now to FIG. 4, it will be seen that the upper surface of the rib 36 is rounded and sufficient clearance is provided in the recess 37 to permit tilting of the rack 24, should the teeth of the rack 24 be out-of-parallel with the teeth of the gear 22. The rack 24 may twist or tilt under pressure from the gear 22 and the resiliency of the springs 31 permit the rack to be repositioned.

Referring now to FIG. 5 in particular, it will be seen that there is illustrated a typical end connection between the rack 24 and the adapter 25. The adapter 25 is provided with a force transmitting block 40 on each end thereof. Each block 40 is secured to the end of the adapter 25 by means of one or more fasteners 41. Each block 40 provides minimum clearance (not shown, but on the order of .0015 inch) with the respective end of the rack 24 in a manner so as to enable the rack 24 to be tilted transversely and also to prevent longitudinal shifting movement of the rack 24 beyond said clearance.

Referring once again to FIG. 2 in particular, it will be seen that the adapter 25 is secured to the underside of the carriage 14 by means of suitable screws 42. It is to be understood, however, that the rack 24 will normally be assembled and secured to the adapter 25 prior to the placement of the carriage 14 on the machine ways 15A and 15B.

The driving gear 22 is mounted on a shaft 43 and is locked thereto by means of set screws 44 (one shown) for rotation therewith. The shaft 43 is journaled in bearings 45 and 46 at one end thereof and a bearing 47 at the opposite end thereof. The bearings 45 and 46 are mounted within a sleeve 48 which, in turn, is mounted within a housing bore 49 in the base 10 while the bearing 47 is mounted within a housing bore 50 in the base 10. It is apparent that the bearings 45, 46 and 47 support the shaft 43 and the gear 42 for rotation by any conventional means including a conventional gear train (not shown). It is to be particularly noted that the shaft 43 is mounted with precision to maintain parallelism between the drive gear 22 and the ways 15A and 15B of the base 10.

OPERATION

Rotation of the conventional gear train of which the gear 22 is a part can be manually effected by rotation of a hand wheel 51 (FIG. 1) or by conventional power means. The shaft 43 and the gear 22 will be rotated to traverse the carriage 14 longitudinally in a line parallel to the ways 15A and 15B.

Precise movement of the carriage 14 is obtained through the self-aligning rack 24 which will absorb any transverse or angular strain from the meshing of gear teeth 21 with the teeth 23 of the rack 24. The rack 24 will yield slightly in a counterclockwise or clockwise manner as shown in FIG. 4 in response to any strain caused by the misalignment between the meshing of the teeth of the rack 24 and the gear teeth 21.

The cushioned mounting of the rack 24 permits all undesired strain of movement to be absorbed by the rack 24 and enables a true tracking of the carriage 14. A full face contact between the gear teeth 21 and the rack teeth 23 is permissible with the self-aligning rack 24 to provide repetitive traverse movement without transferring any minute errors from misalignment or other slight errors in the mating of the teeth of the gear 22 and the rack 24.

It will be readily apparent that the resilient mounting of the rack 24 to the adapter 25 in no way effects the transmittal of a carriage moving force from the rack 24 to the carriage 14 through the adapter 25 in view of the blocks 40 at each end of the rack 24.

At this time it is pointed out that the proper engagement between the gear 22 and the teeth 23 is controlled by slight movement of the handwheel 51 during assembly in a conventional manner.

Although only a preferred embodiment of the invention has been specifically illustrated and described herein, it is to be understood that minor variations may be made in the self-aligning mounting of the rack with respect to the carriage without departing from the spirit and scope of the invention.

I claim:
1. In a mechanism including
 (a) a first member,
 (b) a second member mounted for controlled movement relative to said first member,
 (c) a feed mechanism for moving and positioning said second member relative to said first member,
 (d) said feed mechanism including a rack on one of said members and
 (e) a gear on the other of said members meshed with said rack; the improvement residing in
 (f) means mounting said rack on said one member in a relatively fixed longitudinal position, with radial pivotal movement for self-aligning tooth face contact with the gear of the other member.
2. The mechanism of claim 1 wherein
 (a) said mounting means includes
 (b) an adapter disposed between said rack and said one member,
 (c) said adapter being rigidly secured to said one member,
 (d) said adapter carrying fasteners mounted for limited movement transversely of said adapter,
 (e) said fasteners securing said rack to said adapter.
3. The mechanism of claim 2 wherein
 (a) said rack has a surface abutting an opposing surface on said adapter, and
 (b) one of said surfaces being transversely crowned.
4. The mechanism of claim 1 wherein
 (a) said mounting means includes
 (b) an adapter disposed between said rack and said one member,
 (c) said adapter being rigidly secured to said one member,
 (d) said adapter having an opening therethrough,
 (e) said opening having a shoulder facing away from said rack,
 (f) a fastener loosely disposed within said opening and secured to said rack, and
 (g) a resilient member in said opening re-acting against said shoulder and said fastener to draw the fastener into said opening and resiliently clamp said rack against said adapter.
5. The mechanism of claim 4 wherein
 (a) means are carried by each fastener, including a retainer for said spring, for assuring a uniform clamp- of said rack against said adapter.
6. The mechanism of claim 4 wherein
 (a) a retainer is carried by said fastener remote from said rack with said retainer engaging a respective one of said springs, and

(b) a spacer is clamped between said retainer and said rack to determine the compressing of each spring.

7. The mechanism of claim 4 wherein
(a) said rack has a surface abutting an opposing surface on said adapter, and
(b) one of said surfaces being transversely rounded.

8. The mechanism of claim 1 wherein said mechanism is a machine tool.

9. The mechanism of claim 1 wherein
(a) said mechanism is a grinder
(b) said first member is a grinder base and (c) said second member is a movable support of said grinder.

References Cited

UNITED STATES PATENTS

| | | | |
|---|---|---|---|
| 761,914 | 6/1904 | Riggs | 254—97 |
| 1,936,596 | 11/1933 | Goebert | 254—95 |
| 3,310,990 | 3/1967 | Zettel | 74—422 |

OTHELL M. SIMPSON, Primary Examiner

U.S. Cl. X.R.

74—422; 82—21